(12) United States Patent
Kurauchi et al.

(10) Patent No.: US 12,118,438 B2
(45) Date of Patent: Oct. 15, 2024

(54) LEARNING DATA GENERATION DEVICE, LEARNING DATA GENERATION METHOD, AND PROGRAM

(71) Applicant: NIPPON TELEGRAPH AND TELEPHONE CORPORATION, Tokyo (JP)

(72) Inventors: Yuki Kurauchi, Musashino (JP); Naoto Abe, Musashino (JP); Hiroshi Konishi, Musashino (JP); Hitoshi Seshimo, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 878 days.

(21) Appl. No.: 17/270,862

(22) PCT Filed: Sep. 9, 2019

(86) PCT No.: PCT/JP2019/035346
§ 371 (c)(1),
(2) Date: Feb. 24, 2021

(87) PCT Pub. No.: WO2020/059556
PCT Pub. Date: Mar. 26, 2020

(65) Prior Publication Data
US 2021/0201204 A1    Jul. 1, 2021

(30) Foreign Application Priority Data

Sep. 20, 2018   (JP) .................................. 2018-176174

(51) Int. Cl.
*G06N 20/00* (2019.01)

(52) U.S. Cl.
CPC .................................. *G06N 20/00* (2019.01)

(58) Field of Classification Search
None
See application file for complete search history.

(56) References Cited

U.S. PATENT DOCUMENTS

2017/0116524 A1* 4/2017 Hariharan ......... G06F 16/24575

FOREIGN PATENT DOCUMENTS

JP    2011053427 A    3/2011

OTHER PUBLICATIONS

Keogh, Eamonn, Selina Chu, David Hart, and Michael Pazzani. "Segmenting time series: A survey and novel approach." In Data mining in time series databases, pp. 1-21. 2004. (Year: 2004).*

(Continued)

*Primary Examiner* — Vincent Gonzales
(74) *Attorney, Agent, or Firm* — XSENSUS LLP

(57) ABSTRACT

A training data generation device (10) according to the present invention includes a training data correction unit (11) configured to correct training data that is time-series data that indicates states of an object and in which a label corresponding to a state of the object is assigned to each section that corresponds to the state indicated by the label, wherein the training data correction unit (11) corrects a break time that divides a first section from a second section adjacent to the first section, based on time-series data in the first section and time-series data in the second section.

19 Claims, 5 Drawing Sheets

(56) References Cited

OTHER PUBLICATIONS

Ha, Qishen, Kohei Watanabe, Takumi Karasawa, Yoshitaka Ushiku, and Tatsuya Harada. "MFNet: Towards real-time semantic segmentation for autonomous vehicles with multi-spectral scenes." In 2017 IEEE/RSJ International Conference on Intelligent Robots and Systems (IROS), pp. 5108-5115. IEEE, 2017. (Year: 2017).*

Lovric, Miodrag, Marina Milanović, and Milan Stamenković. "Algoritmic methods for segmentation of time series: An overview." Journal of Contemporary Economic and Business Issues 1, No. 1 (2014): 31-53. (Year: 2014).*

Akihiro Miyata et al., A Study on Barrier Detection Using Sensor Data of Unimpaired Walkers, Information Processing Society of Japan Journal, 2018, pp. 22-32, vol. 59, No. 1.

Detects unevenness on the road surface with the acceleration sensor of the smartphone mounted on the highway bus and conducts verification test, sgforum.impress.co.jp, published on Dec. 28, 2016, from URL: https://sgforum.impress.co.jp/news/3595.

Nov. 12, 2019, International Search Report issued in the International Patent Application No. PCT/JP2019/035346.

* cited by examiner

LEARNING DATA GENERATION DEVICE, LEARNING DATA GENERATION METHOD, AND PROGRAM

TECHNICAL FIELD

The present invention relates to a training data generation device, a training data generation method, and a program.

BACKGROUND ART

A study has been undertaken of technology for estimating the situation (step, slope etc.) of the surface of a road such as a sidewalk or a driveway on which a moving body moves that moves on the road surface, such as an automobile, a pedestrian, or a wheelchair, using a sensor mounted in the moving body (e.g. see NPL 1 and NPL 2).

CITATION LIST

Non Patent Literature

[NPL 1] Akihiro Miyata, Iori Araki, Tongshun Wang, Tenshi Suzuki, "A Study on Barrier Detection Using Sensor Data of Unimpaired Walkers", IPSJ Journal (2018)

[NPL 2] "Kousoku Basu ni Noseta Sumaho no Kasoku-dosensadêta de Romen no Outotu wo Kenti, Kensyou Siken wo Zissi (Detecting unevenness of a road surface with an acceleration sensor of a smartphone mounted on an expressway bus, verification tests conducted)", [online], [Retrieved on Sep. 4, 2018], Internet <URL: https://sgforum.impress.co.jp/news/3595>

SUMMARY OF THE INVENTION

Technical Problem

Estimation of the situation of the road surface such as that mentioned above is often conducted using a model constructed by means of machine learning using training data. To construct such a model, training data is used that is time-series data detected by a sensor in which a label ("flat", "a step exists" etc.) corresponding to a situation of the road surface is assigned to each section that corresponds to the label. Here, commonly, sections to which labels are assigned are manually set. For this reason, an error of about a few milliseconds occurs, and there is a problem in that highly accurate learning is difficult to perform.

The present invention has been made with the foregoing problem in view, and an object of the invention is to provide a training data generation device, a training data generation method, and a program that make it possible to generate training data that enables high-accuracy learning.

Means for Solving the Problem

To solve the above-described problem, a training data generation device according to the present invention includes a training data correction unit configured to correct training data that is time-series data that indicates states of an object and in which a label corresponding to a state of the object is assigned to each section that corresponds to the state indicated by the label, wherein the training data correction unit corrects a break time that divides a first section from a second section adjacent to the first section, based on time-series data in the first section and time-series data in the second section.

Also, to solve the above-described problem, a training data generation method according to the present invention is a training data generation method for use in a training data generation device, the method including a training data correction step of correcting training data that is time-series data that indicates states of an object and in which a label corresponding to a state of the object is assigned to each section that corresponds to the state indicated by the label, wherein in the training data correction step, a break time that divides a first section from a second section adjacent to the first section is corrected based on time-series data in the first section and time-series data in the second section.

Also, to solve the above-described problem, a program according to the present invention causes a computer to function as the above-described training data generation device.

Effects of the Invention

With the training data generation device, the training data generation method, and the program according to the present invention, training data that enables high-accuracy learning can be generated.

DESCRIPTION OF EMBODIMENTS

Figure 1:
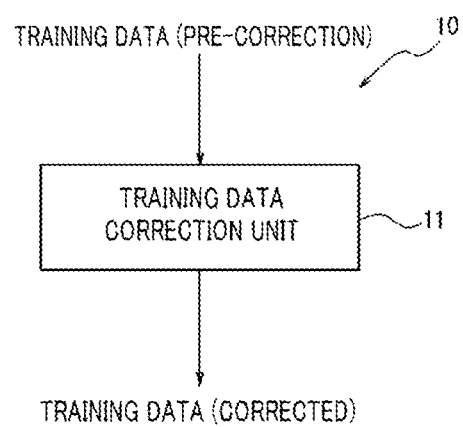
FIG. 1 is a diagram showing an example configuration of a training data generation device according to an embodiment of the present invention.

Modes for carrying out the present invention will be described below with reference to the drawings. In the drawings, the same reference numerals denote the same or equivalent constituent elements.

FIG. 1 is a diagram showing an example configuration of a training data generation device 10 according to an embodiment of the present invention. The training data generation device 10 according to the present embodiment generates training data to be used in machine learning. More specifically, the training data generation device 10 according to the present embodiment corrects training data that is time-series data that indicates states of an object and in which a label corresponding to a state of the object is assigned to each section that corresponds to the state indicated by the label.

The training data generation device 10 shown in FIG. 1 includes a training data correction unit 11.

The training data correction unit 11 corrects training data that is time-series data that indicates states of an object and in which a label corresponding to a state of the object is assigned to each section that corresponds to the state indicated by the label, and outputs the corrected training data. The details of the training data correction performed by the training data correction unit 11 will be described later. Note that the sections in pre-correction training data that correspond to the respective labels and the states indicated by the labels are manually set, for example.

In the following description, it is assumed that the time-series data that indicates states of an object is data detected by a sensor (acceleration sensor, gyroscope sensor, gravitation sensor etc.) mounted in a moving body such as an automobile, a pedestrian, or a wheelchair that moves on the surface of a road, such as a sidewalk or a driveway. That is to say, the time-series data is road surface data that indicates, in time series, the situation (step, slope etc.) of the road surface on which the moving body moves.

Figure 2:
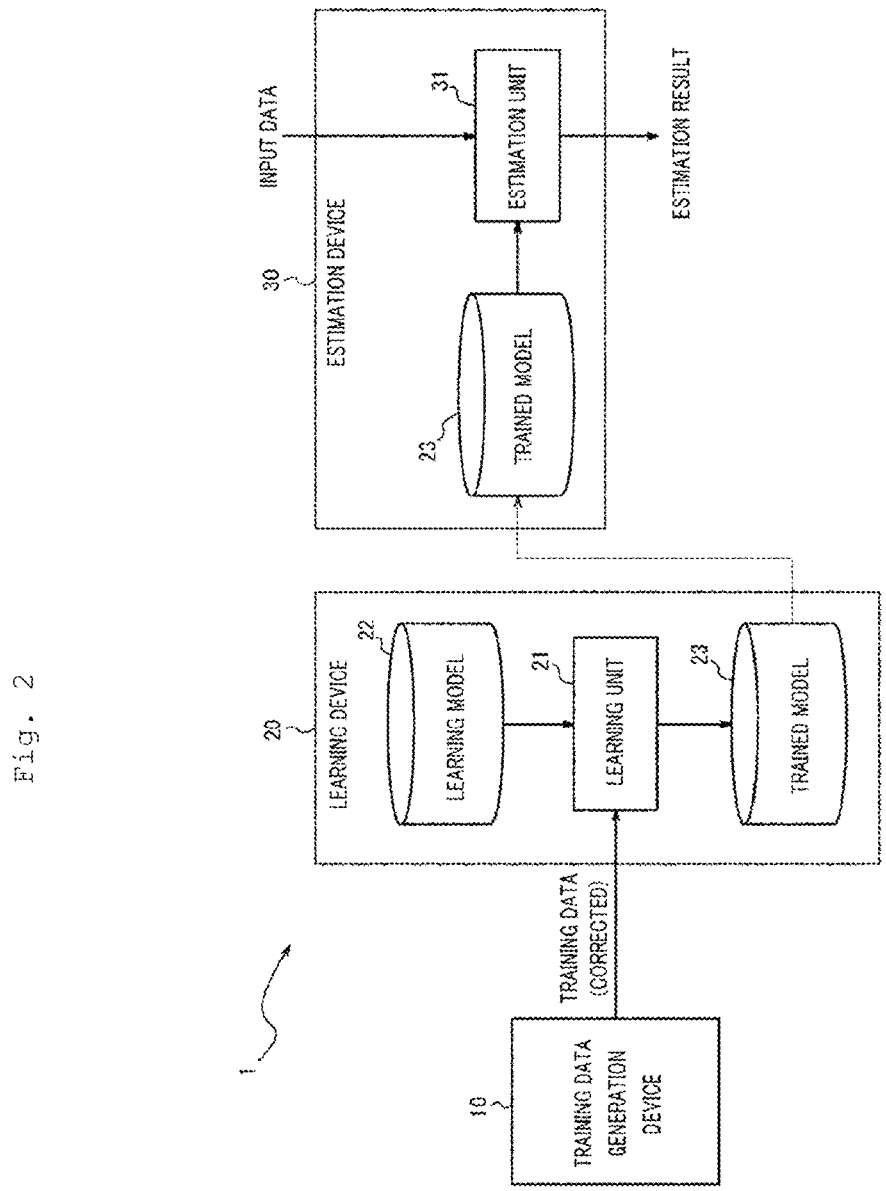
FIG. 2 is a diagram showing an example configuration of an estimation system that includes the training data generation device shown in FIG. 1.

FIG. 2 is a diagram showing an example configuration of an estimation system 1 that includes the training data generation device 10 according to the present embodiment. The estimation system 1 shown in FIG. 2 estimates the situation of the road surface on which the moving body moves, for example.

The estimation system 1 shown in FIG. 2 includes the training data generation device 10, a learning device 20, and an estimation device 30. As mentioned above, the training data generation device 10 receives input of training data that includes time-series data (road surface data) detected by the sensor mounted in the moving body, corrects the training data, and outputs the corrected training data.

The learning device 20 includes a learning unit 21. The learning unit 21 performs machine learning for a learning model 22 using the corrected training data generated by the training data generation device 10, and constructs a trained model 23. The learning model 22 may be any of various models such as a model that uses a convolutional neural network and a SVM (Support Vector Machine).

The estimation device 30 includes an estimation unit 31. The estimation unit 31 receives input of input data that is road surface data detected by the sensor mounted in the moving body that moves on the road surface. The estimation unit 31 inputs the input data to the trained model 23 constructed by the learning device 20, and outputs the output of the trained model 23 as the results of estimating the situation of the road surface on which the moving body moves.

Thus, in the estimation system 1 shown in FIG. 2, the training data generation device 10 generates training data, and the learning device 20 constructs, using the training data, the trained model 23 for estimating the situation of the road surface. The estimation device 30 estimates the situation of the road surface using the constructed trained model 23.

Figure 3:
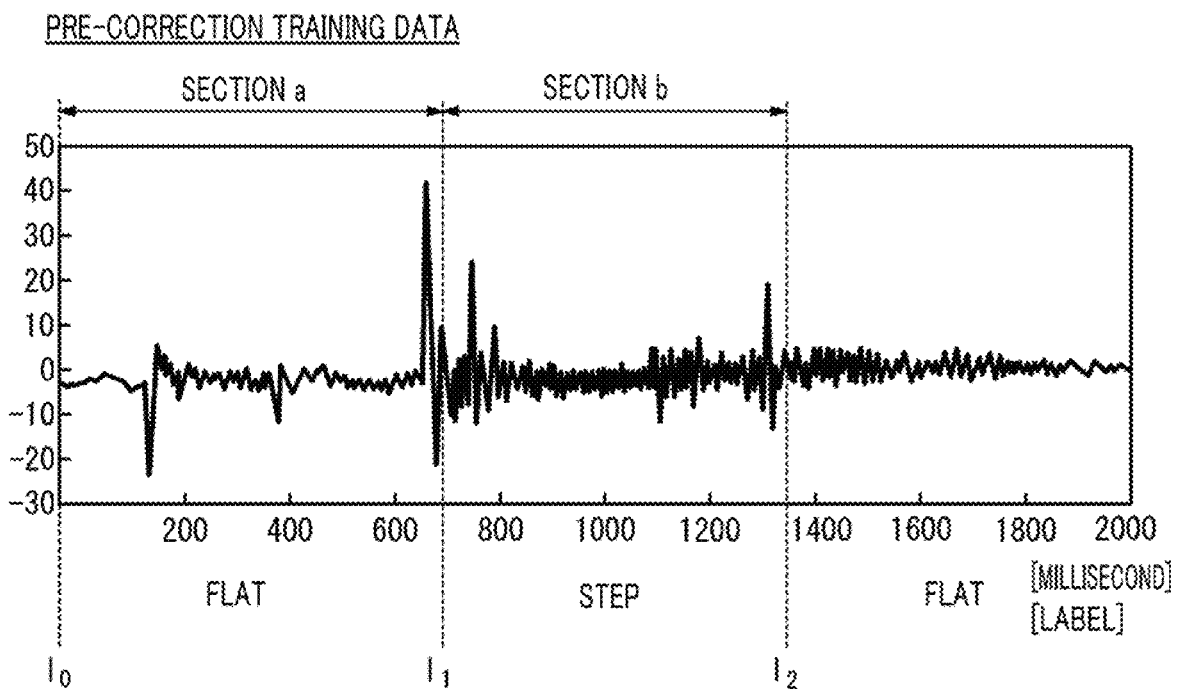
FIG. 3 is a diagram for illustrating an operation of a training data correction unit shown in FIG. 1.
Figure 3:
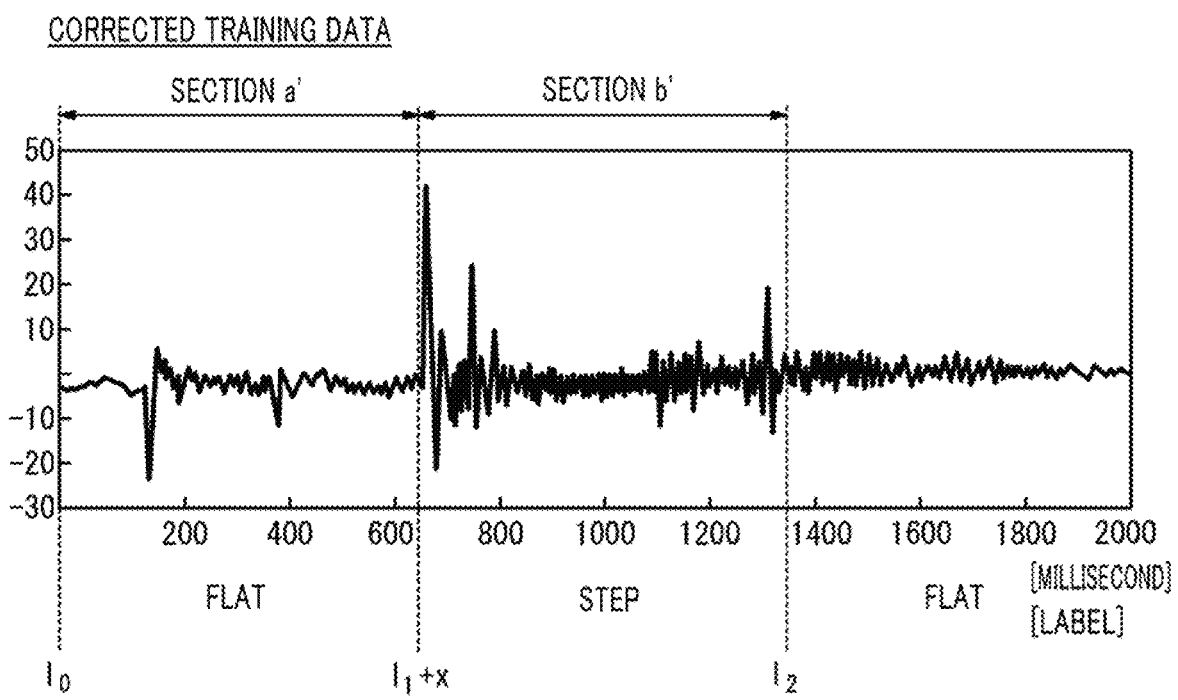

Next, training data correction performed by the training data correction unit 11 will be described in detail with reference to FIG. 3. FIG. 3 shows an example of pre-correction training data and corrected training data.

As mentioned above, training data is time-series data that indicates states of an object and in which a label indicating a state of the object is assigned to each section that corresponds to the state indicated by the label. In the example of the corrected training data shown in FIG. 3, a label indicating that the road surface is flat is assigned to a section a between a break time $l_0$ and a break time $l_1$, and a label indicating that a step exists on the road surface is assigned to a section b between the break time $l_1$ and a break time $l_2$. The break times $l_0, l_1, l_2, \ldots$ that divide the sections a, b, ... to which the labels are assigned from each other are commonly set manually. For this reason, an error may occur in milliseconds, and this error makes it difficult to perform high-accuracy learning.

The training data correction unit 11 reduces errors by shifting the break time that divides adjacent sections from each other. That is to say, the training data correction unit 11 corrects the break time that divides a first section from a second section, based on time-series data in the first section and time-series data in the second section adjacent to the first section. This configuration enables high-accuracy machine learning.

Specifically, the training data correction unit 11 corrects the break time between the first section and the second section so as to maximize the sum of the difference between an average of time-series data in a section (first section) and an average of time-series data in a section (second section) adjacent to the first section and the difference between a variance of the time-series data in the first section and a variance of the time-series data in the second section. That is to say, the training data correction unit 11 corrects the break time in accordance with Formula (1) below.

[Formula 1]

$$l_{t_{new}} = l_t + \underset{-m \le x \le m}{\mathrm{argmax}}\left(f\left(a_{l_{t-1}:l_t+x}, a_{l_t+x:l_{t-1}}\right) + wg\left(a_{l_{t-1}:l_t+x}, a_{l_t+x:l_{t+1}}\right)\right) \quad (1)$$
$$f(a_1, a_2) = |avr(a_1) - avr(a_2)|$$
$$g(a_1, a_2) = |std(a_1) - std(a_2)|$$

In Formula (1), $l_t$ denotes the break time to be corrected, and $l_{t_{new}}$ denotes the corrected break time. x denotes the correction amount of the break time to be corrected, and varies in a range from a predetermined search range −m to m. $a_{l_{t-1}:l_t+x}$ denotes a section from the break time immediately before the break time to be corrected to a time shifted from the break time to be corrected by the correction amount x. $a_{l_t+x:l_{t+1}}$ denotes a section from the time shifted from the break time to be corrected by the correction amount x to the break time immediately after the break time to be corrected. avr(a) denotes an average of time-series data in the section a, and std(a) denotes a variance of the time-series data in the section a. w denotes a weight coefficient.

The following description is given using an example of correcting the break time $l_1$ that divides the section a from the section b in the pre-correction training data shown in FIG. 3.

The training data correction unit 11 shifts the break time $l_1$ to be corrected by the correction amount x in the range from the predetermined search range −m to m. Then, the training data correction unit 11 calculates the difference between an average of time-series data in a section a' from a break time $l_0$ to a break time $l_1+x$ and an average of time-series data in a section b' from the break time $l_1+x$ to a break time $l_2$. The training data correction unit 11 also calculates the difference between a variance of the time-series data in the section a' and the variance of the time-series data in the section b'. The training data correction unit 11 determines the correction amount x so as to maximize the weighted sum of the difference between the average in the section a' and the average in the section b' and the difference between the variance in the section a' and the variance in the section b'. Thus, the training data correction unit 11 corrects the break time $l_1$.

As shown in FIG. 3, a large peak is present at the end of the section a. Usually, when the moving body is moving on a flat road surface, such a large peak does not occur. Accordingly, it is conceivable that the large peak at the end of the section a has occurred due to the moving body having moved on a road surface with a step. However, in the corrected training data, this large peak is included in the section a that is assigned a label indicating that the road surface is flat. Even if this training data is used in machine learning, high-accuracy learning cannot be performed.

In contrast, in the present embodiment, the correction amount x is determined so as to maximize the sum of the difference between the average in the section a' and the average in the section b' and the difference between the variance in the section a' and the variance in the section b'. Thus, the peak that is present near the break time between the section a and the section b is then included in the section b' in which the time-series data varies more greatly (a section that is assigned a label indicating that a step exists on the road surface).

As a result, in the corrected training data, the large peak that was present at the end of the section a is included in the section b' that is assigned the label indicating that a step exists on the road surface.

Accordingly, errors in the learning are reduced, and high-accuracy learning can be performed by using such training data in machine learning.

Figure 4:
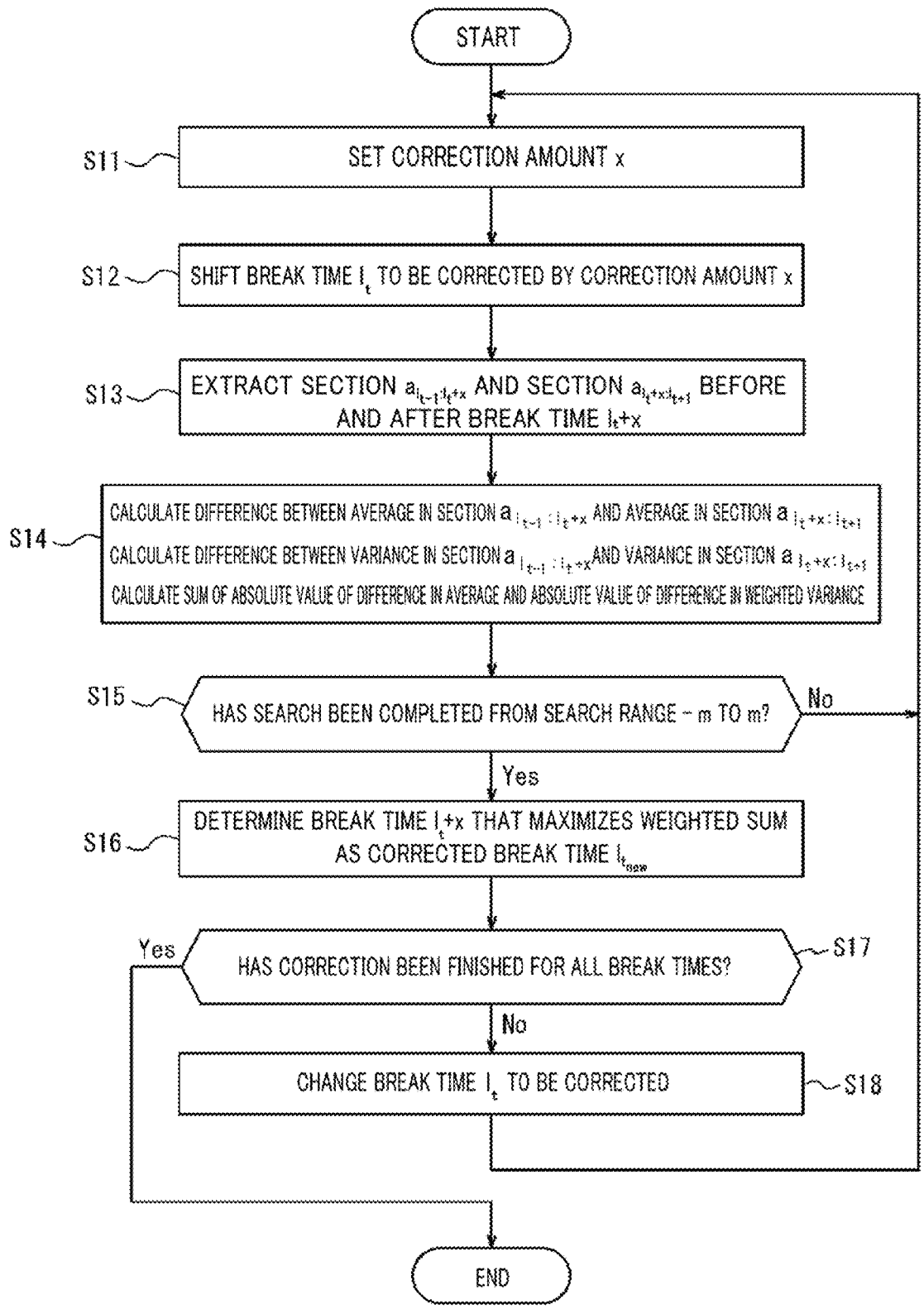
FIG. 4 is a flowchart for illustrating a training data generation method used in the training data generation device shown in FIG. 1.

FIG. 4 is a flowchart for illustrating a training data generation method used in the training data generation device 10 according to the present embodiment.

Firstly, the training data correction unit 11 sets a correction amount x by which a break time $l_t$ to be corrected is to be shifted (step S11), and shifts the break time $l_t$ to be corrected by the set correction amount x (step S12). Note that the training data correction unit 11 determines the correction amount x in a range from a predetermined search range −m to m.

Next, the training data correction unit 11 extracts, from time-series data, a section $a_{l_{t-1}:l_t+x}$ and a section $a_{l_t+x:l_{t+1}}$ immediately before and after the break time $l_t+x$ (step S13).

Next, the training data correction unit 11 calculates the difference between an average of time-series data in the section $a_{l_{t-1}:l_t+x}$ and an average of time-series data in the section $a_{l_t+x:l_{t+1}}$. The training data correction unit 11 also calculates the difference between a variance of the time-series data in the section $a_{l_{t-1}:l_t+x}$ and the variance of the time-series data in the section $a_{l_t+x:l_{t+1}}$. Then, the training data correction unit 11 calculates the weighted sum of the absolute value of the difference in average and the absolute value of the difference in variance in accordance with the aforementioned Formula (1) (step S14).

Next, the training data correction unit 11 determines whether or not the search has been completed from the predetermined search range −m to m (step S15). That is to say, the training data correction unit 11, for example, increments or decrements the correction amount x by a predetermined amount from the predetermined search range −m to m, and determines whether or not the aforementioned weighted sum has been calculated for the respective correction amounts x.

If it is determined that the search has not been completed from the predetermined search range −m to m (step S15: No), the training data correction unit 11 returns to the processing in step S11, changes the correction amount x, and repeats the above-described processing. For example, the training data correction unit 11 changes the correction amount x by increasing or reducing the correction amount x with which the weighted sum has been calculated immediately previously, by a predetermined amount in a range from the predetermined search range −m to m.

If it is determined that the search has been completed from the predetermined search range −m to m (step S15: Yes), the training data correction unit 11 specifies the correction amount x that maximizes the calculated weighted sum, and determines, as the corrected break time $l_{t_{new}}$ a break time $l_t+x$ obtained by adding the specified correction amount x to the time $l_t$ to be corrected (step S16).

Steps S11 to S16 shown in FIG. 4 correspond to training data correction steps of correcting training data that is time-series data that indicates states of an object and in which a label corresponding to a state of the object is assigned to each section that corresponds to the state indicated by the label, in the training data generation method according to the present embodiment. In the training data correction step, the training data correction unit 11 corrects the break time $l_t$ that divides the first section from the second section, based on time-series data in the first section (section $a_{l_{t-1}:l_t+x}$) and time-series data in the second section (section $a_{l_t+x:l_{t+1}}$) adjacent to the first section. More specifically, in the training data correction step, the training data correction unit 11 corrects the break time between the first section and the second section so as to maximize the sum of the difference between an average of the time-series data in the first section and an average of the time-series data in the second section adjacent to the first section and the difference between a variance of the time-series data in the first section and a variance of the time-series data in the second section (see step S14) (see step S16).

Next, the training data correction unit 11 determines whether or not correction has been finished for all break times that divide sections that are assigned labels from each other (step S17).

If it is determined that correction has not been finished for all break times (step S17: No), the training data correction unit 11 changes the break time $l_t$ to be corrected (step S18), and returns to the processing in step S11.

If it is determined that correction has been finished for all break times (step S17: Yes), the training data correction unit 11 outputs the corrected training data and ends the processing.

Figure 5:
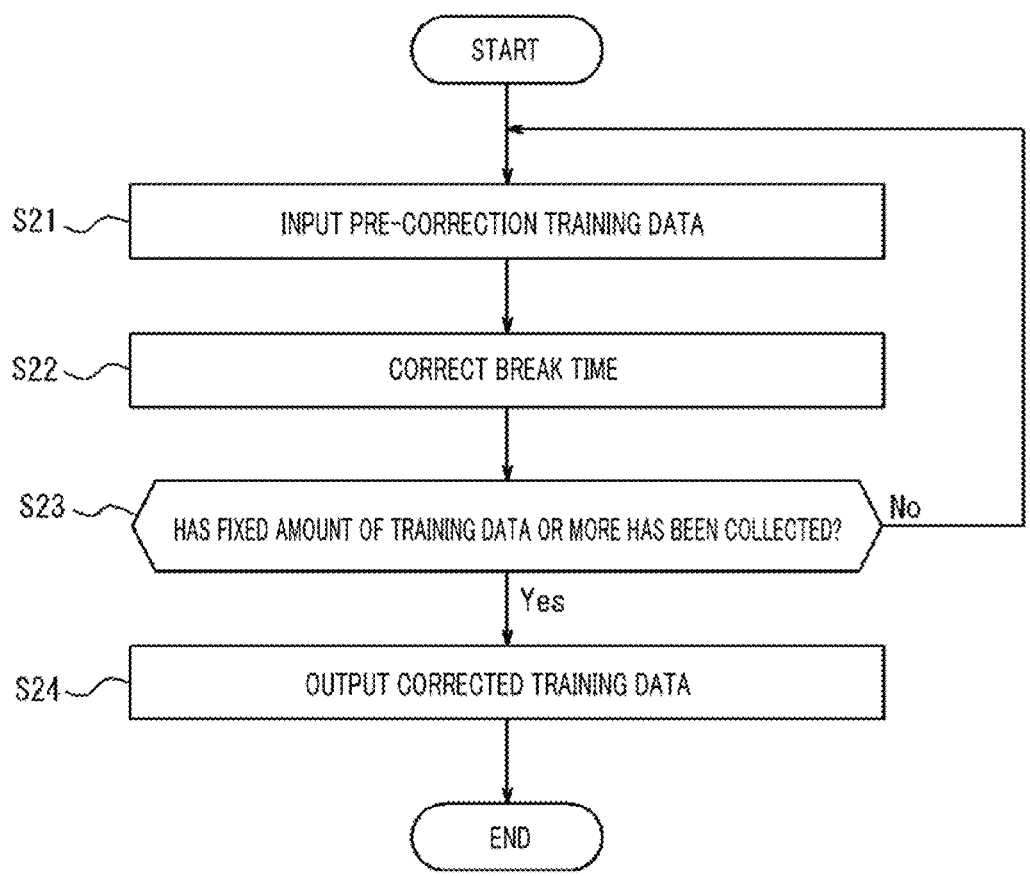
FIG. 5 is a flowchart showing an operation of the training data generation device shown in FIG. 1.

FIG. 5 is a flowchart showing an operation of the training data generation device 10 according to the present embodiment.

Upon receiving input of pre-correction training data that includes time-series data in which labels indicating states of an object are assigned to sections that correspond to the respective states (step S21), the training data correction unit 11 corrects a break time in the training data (step S22). The training data correction unit 11 corrects the break time using the method that has been described with reference to FIG. 4.

Next, the training data correction unit 11 determines whether or not a fixed amount of corrected training data or more has been collected (step S23).

If it is determined that the fixed amount of corrected training data or more has been collected (step S23: Yes), the training data correction unit 11 outputs the corrected training data (step S24), and ends the processing.

If it is determined that the fixed amount of corrected training data or more has not been collected (step S23: No), the training data correction unit 11 returns to the processing in step S21.

Thus, in the present embodiment, the training data generation device 10 includes the training data correction unit 11 that corrects training data, which is time-series data that indicates states of an object and in which a label corresponding to a state of the object is assigned to each section that corresponds to the state indicated by the label. The training data correction unit 11 corrects a break time that divides a first section from a second section, based on time-series data in the first section and time-series data in the second section that is adjacent to the first section.

By correcting the break time that divides the first section from the second section that are adjacent to each other based on the time-series data in the first section and the second section, even if the break time in pre-correction training data contains an error, the break time can be corrected so as to reduce the error. As a result, the corrected training data enables high-accuracy learning.

Although the present embodiment has been described using an example where the training data generation device 10 generates training data based on time-series data detected by a sensor mounted in a moving body, the present invention is not limited thereto. The training data generation device 10 can be applied to correction of training data that includes various kinds of time-series data.

The training data generation device 10 has been described thus far, and here, a computer can also be used to cause the computer to function as the training data generation device 10. Such a computer can be realized by storing, in advance, a program in which the processing content for realizing the functionality of the training data generation device 10 is described, in a storage unit of the computer, and loading and executing this program using a CPU of the computer.

The program may be recorded in a computer-readable recording medium. Using such a recording medium, the program can be installed in the computer. Here, the recording medium in which the program is recorded may be a non-transitory recording medium. The non-transitory recording medium is not specifically limited, but may be, for example, a recording medium such as a CD-ROM or a DVD-ROM.

Although the above embodiment has been described as a typical example, it is apparent for those skilled in the art that many modifications and replacements can be made within the gist and the scope of the present invention. Accordingly, the present invention should not be construed as being limited by the above embodiment, and various modifications and changes can be made without departing from the claims. For example, it is possible to combine a plurality of constituent blocks shown in the configuration diagrams of the embodiment into one constituent block, or to divide one constituent block.

REFERENCE SIGNS LIST

1 Estimation system
10 Training data generation device
11 Training data correction unit
20 Learning device
21 Learning unit
22 Learning model
23 Trained model
30 Estimation device
31 Estimation unit

The invention claimed is:

1. A training data generation device comprising:
a processor configured to
correct training data that is time-series data that indicates states of an object and in which a label corresponding to a state of the object is assigned to each section that corresponds to the state indicated by the label,
wherein the processor corrects a break time that divides a first section from a second section adjacent to the first section, based on time-series data in the first section and time-series data in the second section,
the processor corrects the break time so as to maximize a sum of a difference between an average of the time-series data in the first section and an average of the time-series data in the second section and a difference between a variance of the time-series data in the first section and a variance of the time-series data in the second section, and
the training data, after correction, is used to train a model that estimates and outputs a condition of a road surface corresponding to the training data.

2. The training data generation device according to claim 1, wherein the training data includes road surface data that is detected by a sensor mounted on a moving body moving on the road surface and indicates a situation of the road surface.

3. The training data generation device according to claim 2, wherein the moving body is one of a car, a pedestrian, or a wheelchair.

4. The training data generation device according to claim 3, wherein the sensor is one of an acceleration sensor, a gyroscopic sensor, or a gravitational sensor.

5. The training data generation device according to claim 4, wherein the training data indicates at least one of a step or a slope in the road surface.

6. The training data generation device according to claim 5, wherein the model is a convolutional neural network.

7. The training data generation device according to claim 5, wherein the model is a support vector machine.

8. A training data generation method for use in a training data generation device, the method comprising:
correcting training data that is time-series data that indicates states of an object and in which a label corresponding to a state of the object is assigned to each section that corresponds to the state indicated by the label,
wherein in correcting the training data, a break time that divides a first section from a second section adjacent to the first section is corrected based on time-series data in the first section and time-series data in the second section,
the break time is corrected so as to maximize a sum of a difference between an average of the time-series data in the first section and an average of the time-series data in the second section and a difference between a variance of the time-series data in the first section and a variance of the time-series data in the second section, and
the training data, after correction, is used to train a model that estimates and outputs a condition of a road surface corresponding to the training data.

9. The training data generation method according to claim 8, wherein the training data includes road surface data that is detected by the sensor mounted on a moving body moving on a road surface and indicates a situation of the road surface.

10. The training data generation method according to claim 9, wherein the moving body is one of a car, a pedestrian, or a wheelchair.

11. The training data generation method according to claim 10, wherein the sensor is one of an acceleration sensor, a gyroscopic sensor, or a gravitational sensor.

12. The training data generation method according to claim 11, wherein the training data indicates at least one of a step or a slope in the road surface.

13. The training data generation method according to claim 12, wherein the model is a convolutional neural network.

14. The training data generation method according to claim 13, wherein the model is a support vector machine.

15. A non-transitory computer-readable medium encoded with computer-readable instructions that, when executed by a processor, cause the processor to perform a method comprising:
correcting training data that is time-series data that indicates states of an object and in which a label corresponding to a state of the object is assigned to each section that corresponds to the state indicated by the label,
wherein in correcting the training data, a break time that divides a first section from a second section adjacent to the first section is corrected based on time-series data in the first section and time-series data in the second section,
the break time is corrected so as to maximize a sum of a difference between an average of the time-series data in the first section and an average of the time-series data in the second section and a difference between a variance of the time-series data in the first section and a variance of the time-series data in the second section, and
the training data, after correction, is used to train a model that estimates and outputs a condition of a road surface corresponding to the training data.

16. The non-transitory computer-readable medium according to claim 15, wherein the training data includes road surface data that is detected by a sensor mounted on a moving body moving on the road surface and indicates a situation of the road surface,
the moving body is one of a car, a pedestrian, or a wheelchair, and
the sensor is one of an acceleration sensor, a gyroscopic sensor, or a gravitational sensor.

17. The non-transitory computer-readable medium according to claim 16, wherein the training data indicates at least one of a step or a slope in the road surface.

18. The non-transitory computer-readable medium according to claim 17, wherein the model is a convolutional neural network.

19. The non-transitory computer-readable medium according to claim 18, wherein the model is a support vector machine.

* * * * *